(12) United States Patent
Park et al.

(10) Patent No.: US 11,067,678 B2
(45) Date of Patent: Jul. 20, 2021

(54) RADAR DEVICE USING DELAY

(71) Applicant: ELECTRONICS AND TELECOMMUNICATIONS RESEARCH INSTITUTE, Daejeon (KR)

(72) Inventors: Pil Jae Park, Daejeon (KR); Seongdo Kim, Daejeon (KR); Bon Tae Koo, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 240 days.

(21) Appl. No.: 16/037,998

(22) Filed: Jul. 17, 2018

(65) Prior Publication Data

US 2019/0025417 A1    Jan. 24, 2019

(30) Foreign Application Priority Data

Jul. 20, 2017  (KR) .................. 10-2017-0092276
Feb. 6, 2018  (KR) .................. 10-2018-0014763

(51) Int. Cl.
*G01S 13/12*  (2006.01)
*G01S 7/292*  (2006.01)
(Continued)

(52) U.S. Cl.
CPC ............. *G01S 13/12* (2013.01); *G01S 7/023* (2013.01); *G01S 7/038* (2013.01); *G01S 7/2921* (2013.01); *G01S 7/4004* (2013.01)

(58) Field of Classification Search
CPC .......... G01S 13/12; G01S 7/023; G01S 7/038; G01S 7/2921; G01S 7/4004
(Continued)

(56) References Cited

U.S. PATENT DOCUMENTS

| 4,014,021 A | * | 3/1977 | Fournier | ............... G01S 13/325 342/88 |
| 4,359,735 A | * | 11/1982 | Lewis | ................... G01S 13/282 342/194 |

(Continued)

FOREIGN PATENT DOCUMENTS

| EP | 2703832 A2 | * | 3/2014 | ........... G01S 13/878 |
| JP | H07325152 A | * | 5/1994 | ............. G01S 17/10 |

(Continued)

OTHER PUBLICATIONS

"Low-Power Sliding Correlation CMOS UWB Pulsed Radar Receiver for Motion Detection" Anh Tuan Phan, and Ronan Farrell, Min-Suk Kang, Seok-Kyun Han, Sang-Gug Lee. IEEE Communications (Year: 2009).*

(Continued)

*Primary Examiner* — Vladimir Magloire
*Assistant Examiner* — Alexander L. Syrkin (57) ABSTRACT

A radar device according to an embodiment of the inventive concept includes a clock generator, a transmitter, a receiver, and a signal processor. The clock generator outputs the transmission clock, outputs the reception clock at the second time after the delay from the first time when the transmission clock is outputted, and generates the notification signal when the delay has the minimum value. The transmitter emits a transmission signal based on the transmission clock. The receiver receives an echo signal corresponding to the transmission signal, and generates a first signal corresponding to the echo signal based on the reception clock. The signal processor obtains a third time point at which a delay has the minimum value based on the notification signal.

15 Claims, 9 Drawing Sheets

(51) Int. Cl.
*G01S 7/02* (2006.01)
*G01S 7/40* (2006.01)
*G01S 7/03* (2006.01)

(58) Field of Classification Search
USPC .......................................................... 342/88
See application file for complete search history.

(56) References Cited

U.S. PATENT DOCUMENTS

| | | | |
|---|---|---|---|
| 4,816,834 A * | 3/1989 | Bjorke | G01S 13/325 |
| | | | 342/120 |
| 5,361,070 A | 11/1994 | McEwan | |
| 5,565,870 A * | 10/1996 | Fukuhara | G01S 7/2926 |
| | | | 342/70 |
| 5,764,551 A * | 6/1998 | McCorkle | G01R 13/0272 |
| | | | 702/190 |
| 5,805,110 A | 9/1998 | McEwan | |
| 7,551,703 B2 | 6/2009 | McEwan | |
| 7,675,459 B2 | 3/2010 | Yoshimura | |
| 7,710,794 B2 | 5/2010 | Kim et al. | |
| 8,618,858 B2 | 12/2013 | Kim et al. | |
| 9,581,688 B2 * | 2/2017 | Park | G01S 7/28 |
| 10,641,883 B2 * | 5/2020 | Park | G01S 13/526 |
| 2004/0196175 A1 * | 10/2004 | Matsuoka | G01S 7/285 |
| | | | 342/118 |
| 2005/0001758 A1 * | 1/2005 | Hiromori | G01S 13/103 |
| | | | 342/82 |
| 2007/0024493 A1 * | 2/2007 | Ikeda | G01S 13/103 |
| | | | 342/70 |
| 2009/0116302 A1 * | 5/2009 | Kim | G11C 7/222 |
| | | | 365/189.07 |
| 2011/0012774 A1 * | 1/2011 | Sakai | G01S 7/4021 |
| | | | 342/145 |
| 2014/0354469 A1 * | 12/2014 | Park | G01S 7/28 |
| | | | 342/195 |
| 2016/0223645 A1 * | 8/2016 | Kim | G01S 7/023 |

FOREIGN PATENT DOCUMENTS

| | | | | |
|---|---|---|---|---|
| JP | H07325152 A | | 12/1995 | |
| KP | 20090045591 A | * | 5/2009 | ........... G11C 11/407 |
| KP | 20140140151 A | * | 12/2014 | ............... G01S 1/24 |
| KR | 1020090045591 A | | 5/2009 | |
| KR | 1020140140151 A | | 12/2014 | |
| WO | WO-2017116674 A1 | * | 7/2017 | ......... H04W 56/007 |

OTHER PUBLICATIONS

Anh Tuan Phan et al., "Low-Power Sliding Correlation CMOS UWB Pulsed Radar Receiver for Motion Detection", ISCAS 2009 IEEE International Symposium on Circuits and Systems, May 24-27, 2009, pp. 1541-1544, IEEE.

* cited by examiner

RADAR DEVICE USING DELAY

CROSS-REFERENCE TO RELATED APPLICATIONS

This U.S. non-provisional patent application claims priority under 35 U.S.C. § 119 of Korean Patent Application Nos. 10-2017-0092276, filed on Jul. 20, 2017, and 10-2018-0014763, filed on Feb. 6, 2018, the entire contents of which are hereby incorporated by reference.

BACKGROUND

The present disclosure relates to a radar device, and more particularly, to a configuration and a characteristic of a radar device.

The radar device may transmit radio waves and receive reflected waves. The radar device may measure an elapsed time between transmission of the radio waves and the reception of the radio waves. The radar device may detect the direction and the position of objects reflecting the transmitted radio wave based on the measured time. The radio waves used in the radar may have signal frequencies of several MHz to tens of GHz.

Types of a radar device include pulse radar devices and continuous wave radar devices. The pulse radar devices may repeatedly transmit transmission pulse signals and receive echo signals reflected by objects.

The radar device may perform signal processing in the process of detecting objects. In the process of processing the signals, the signals may include noise due to various factors. The signals including noise may represent inaccurate information. Therefore, there is a need to reduce the noise included in the signals.

SUMMARY

The present disclosure is to provide a configuration and operation of a radar device for reducing noise included in signals processed to obtain information.

An embodiment of the inventive concept provides a radar device including a clock generator, a transmitter, a receiver, and a signal processor. The clock generator outputs the transmission clock, outputs the reception clock at the second time after the delay from the first time when the transmission clock is outputted, and generates the notification signal when the delay has the minimum value. The transmitter emits a transmission signal based on the transmission clock. The receiver receives an echo signal corresponding to the transmission signal based on the reception clock, and generates a first signal corresponding to the echo signal. The signal processor obtains a third time point at which a delay has a minimum value based on the notification signal, and obtains a fourth time point at which the echo signal is received by the receiver based on the first signal. Then, the receiver obtains data related to the position of a target based on the third time point and the fourth time point. Within a period in which the delay between the first time point and the second time point changes, the delay may have one of different values, and the minimum value is the smallest one of the different values.

BRIEF DESCRIPTION OF THE FIGURES

The accompanying drawings are included to provide a further understanding of the inventive concept, and are incorporated in and constitute a part of this specification. The drawings illustrate example embodiments of the inventive concept and, together with the description, serve to explain principles of the inventive concept. In the drawings.

DETAILED DESCRIPTION

In the following, embodiments of the inventive concept will be described in detail so that those skilled in the art easily carry out the inventive concept.

Hereinafter, the term "transmission signal" is used in this specification. The transmission signal may refer to a signal radiated from a radar device to detect objects or the likes. Hereinafter, the term "echo signal" is used in this specification. The echo signals may be a signal reflected by objects or the likes and received by the radar device. Hereinafter, the term "pulse" is used in this specification. A pulse may refer to a signal (e.g., a square wave) having a magnitude that varies (e.g., oscillates) over a specified time. For example, if the clock has a logical low value or a logical high value, the "clock pulse" may refer to a signal from a time at which the logical value of the clock changes from the logical low value to the logical high value (the rising edge of the clock) to the time at which the logical value of the clock changes from the logical high value to the logical low value (the falling edge of the clock).

Figure 1:
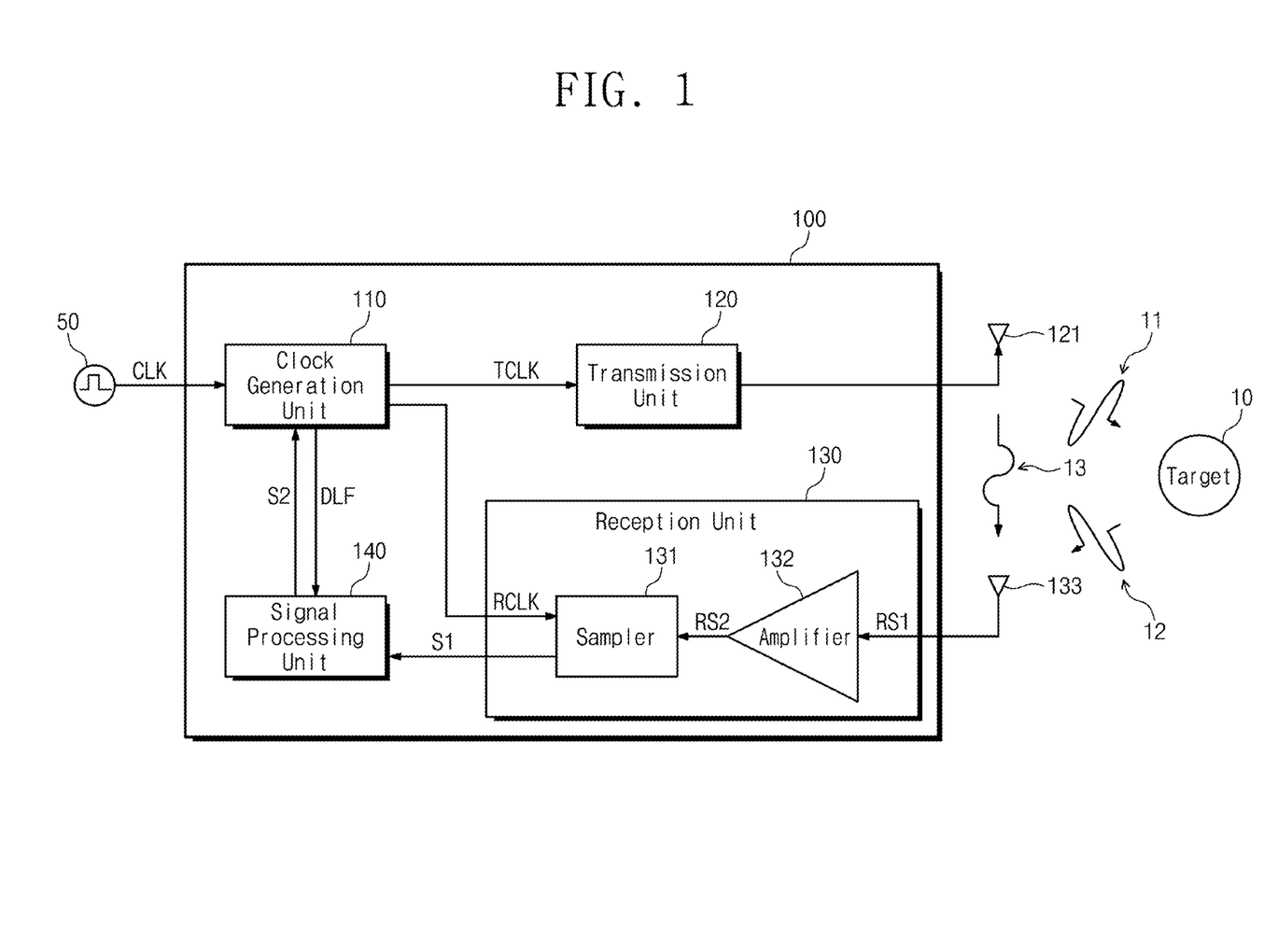
FIG. 1 is a block diagram illustrating a radar device according to an embodiment of the inventive concept.

FIG. 1 is a block diagram illustrating a radar device according to an embodiment of the inventive concept.

Referring to FIG. 1, a radar device 100 may include a clock generation unit 110, a transmission unit 120, a reception unit 130, and a signal processing unit 140. The reception unit 130 may include a sampler 131 and an amplifier 132. The radar device 100 may be connected to a transmission antenna 121 and a reception antenna 133.

The clock generation unit 110 may receive the reference clock CLK from the reference clock generation unit 50. The clock generation unit 110 may generate a clock (hereinafter referred to as a transmission clock) TCLK used to generate a transmission signal in the transmission unit 120 based on the reference clock CLK. The clock generation unit 110 may generate a clock (hereinafter referred to as a reception clock) RCLK used to recover the received echo signal in the reception unit 130 based on the reference clock CLK. The clock generation unit 110 may output the transmission clock TCLK to the transmission unit 120 and output the reception clock RCLK to the reception unit 130.

Each of the transmission clock TCLK and the reception clock RCLK may periodically have a logical low value or a logical high value. The transmission clock TCLK and the reception clock RCLK may include pulses of a clock that occurs periodically.

The clock generation unit 110 may include a delay locked loop (DLL). The clock generation unit 110 may adjust the delay by the DLL. The delay means a time length between a time at which the transmission clock TCLK is outputted from the clock generation unit 110 and a time at which the reception clock RCLK is outputted from the clock generation unit 110. The DLL may include a voltage controlled delay line (VCDL). The VCDL may generate pulses with different delays by using the reference clock CLK.

The DLL may generate the transmission clock TCLK using the pulses generated by the VCDL. In addition, the DLL may generate a reception clock RCLK delayed by a specific time from the transmission clock TCLK. Accordingly, the clock generation unit 110 may adjust the delay using the pulses generated by the VCDL.

The clock generation unit 110 may start the operation in response to the signal S2 received from the signal processing unit 140. The clock generation unit 110 may obtain information related to the delay (hereinafter, delay information) from the signal S2. The delay information may be used to specify the delay. For example, the delay information may include information related to the minimum value of the delay, the delay period, and the difference value between the delays. The delay information will be described in detail with reference to FIGS. 5 and 6. Alternatively, the clock generation unit 110 may start an operation based on the previously stored delay information as a default. Hereinafter, a clock generation unit 110 that starts an operation in response to the signal S2 will be described.

Figure 4:
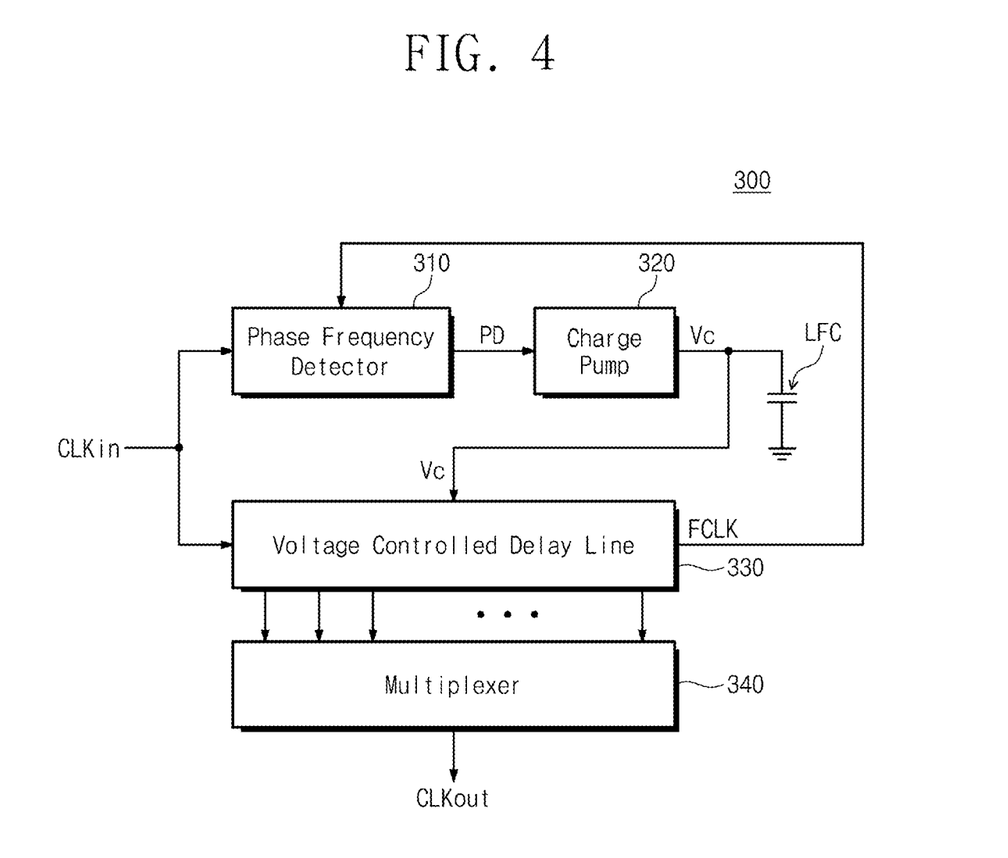
FIG. 4 is a block diagram illustrating an example method of adjusting delay by a clock generator of FIG. 1.

The clock generation unit 110 may determine the delay based on the delay information. For example, the multiplexer may selectively output a pulse of a transmission clock TCLK and a pulse of a reception clock RCLK based on a specific delay by the signal S2. Referring to FIG. 4, the DLL will be described in more detail. Hereinafter, an embodiment in which the delay is determined by the clock generation unit 110 will be described.

The delay may be related to the detection range of the radar device 100. For example, as the delay is longer, the detection range of the radar device 100 may be longer. For example, as the delay is shorter, the detection range of the radar device 100 may be shorter. In order to detect objects located at different detection ranges, the radar device 100 may change the delay by the clock generation unit 110.

As will be described with reference to FIG. 5, the delay may have a value that varies repeatedly with a certain period. Within one period, different delays corresponding to different times may have different values respectively. Hereinafter, the minimum delay may mean a delay having the smallest value among the different values that the delay may have within the period of the delay. The delay information may include information related to the minimum delay.

The clock generation unit 110 may output a pulse of the reception clock RCLK to the reception unit 130 after a minimum delay from a time at which a pulse of the transmission clock TCLK is outputted to the transmission unit 120. If the minimum delay is zero, the clock generation unit 110 may substantially simultaneously output the pulse of the transmission clock TCLK and the pulse of the reception clock RCLK.

Thereafter, the clock generation unit 110 may sequentially output the pulse of the transmission clock TCLK and the pulse of the reception clock RCLK based on the delays longer than the minimum delay. For example, the clock generation unit 110 may output the pulses of the transmission clock TCLK and the pulses of the reception clock RCLK based on a periodically changing delay "k*Δta" (k is a natural number). For example, k may increase for a particular period. After the delay "k*Δta" reaches the maximum delay (i.e., after the clock generation unit 110 outputs the pulse of the transmission clock TCLK and the pulse of the reception clock RCLK based on the maximum delay), the clock generation unit 110 may again output the pulse of the transmission clock TCLK and the pulse of the reception clock RCLK based on the minimum delay. In this specification, the maximum delay may mean a delay having the largest value among the different values that the delay may have within the period of the delay. Referring to FIGS. 5 and 6, the periodically varying delay will be described in detail.

For example, the clock generation unit 110 may determine new delays based on the delay information obtained from the signal S2. The clock generation unit 110 may output pulses of the transmission clock TCLK and pulses of the reception clock RCLK based on the newly determined delays. For example, the clock generation unit 110 may output a pulse of the reception clock RCLK to the reception unit 130 after a newly determined delay from a time at which a pulse of the transmission clock TCLK is outputted to the transmission unit 120.

The clock generation unit 110 may output the notification signal DLF related to the delay to the signal processing unit 140. For example, if the clock generation unit 110 outputs a pulse of the transmission clock TCLK and a pulse of the reception clock RCLK based on the minimum delay, the notification signal DLF may be outputted to deliver the time corresponding to the minimum delay to the signal processing unit 140. Alternatively, if the delay changes, in order to transmit data relating to the delay to be changed to the signal processing unit 140, the clock generation unit 110 may output the notification signal DLF indicating n-bit data. Referring to FIG. 5, example notification signals outputted in response to a delay are described.

The transmission unit 120 may receive the transmission clock TCLK from the clock generation unit 110. The transmission unit 120 may emit a transmission signal 11 and a transmission signal 13 based on the transmission clock TCLK. Transmission unit 120 may include an oscillator or the like to emit the transmission signals 11 and 13.

In FIG. 1, the transmission signal 11 and the transmission signal 13 are shown as separate signals, but the transmission signal 11 and the transmission signal 13 are signals included in one transmission signal. Thus, the transmission antenna 121 emits the transmission signal 11 and the transmission signal 13 at substantially the same time. For convenience of explanation, the transmission signal 11 and the transmission signal 13 are described as separate signals.

The oscillator may generate an oscillation signal based on the transmission clock TCLK. For example, the oscillator may generate a signal having a specific frequency in response to a pulse of an applied transmission clock TCLK. For example, the signal generated by the oscillator may include a sine wave having the specific frequency. The transmission unit 120 may emit the transmission signals 11 and 13 through the transmission antenna 121 based on a signal generated in the oscillator.

The transmission unit 120 may emit the transmission signal 11 to the target 10. The transmission signal 11 may be reflected by the target 10. The echo signal 12 associated with the transmission signal 11 may be received from the target 10. Thus, the echo signal 12 may represent information related to the target 10. For example, the echo signal 12 may be related to the location and speed of the target 10. The echo signal 12 from the target 10 may be received by the reception unit 130. The detection range corresponding to the echo signal 12 may be the range between the radar device 100 and the target 10. The distance between the radar device 100 and the target 10 may be substantially the same as the distance between the transmission antenna 121 and the target 10 and the distance between the reception antenna 133 and the target 10.

Also, the transmission unit 120 may emit the transmission signal 13. The reception antenna 133 may receive the transmission signal 13 directly from the transmission antenna 121. Thus, the detection range corresponding to the transmission signal 13 may be zero.

The reception unit 130 may receive the reception clock RCLK from the clock generation unit 110. The reception unit 130 may receive the echo signal 12 corresponding to the transmission signal 11 through the reception antenna 133. Alternatively, the reception unit 130 may receive the transmission signal 13 through the reception antenna 133. The reception antenna 133 may output the signal RS1 generated from both the echo signal 12 and the transmission signal 13 to the amplifier 132.

The amplifier 132 may receive the signal RS1 from the reception antenna 133. The amplifier 132 may amplify the received signal RS1. For example, the amplifier 132 may include a Low Noise Amplifier (LNA). The LNA may be implemented by a parametric amplifier, a field effect transistor amplifier, a tunnel diode amplifier, and a traveling wave tube amplifier. The amplifier 132 amplifies the signal RS1 and outputs the generated signal RS2 to the sampler 131.

As described above, the signal RS1 may be generated based on the echo signal 12 and the transmission signal 13, and the signal RS2 may be amplified based on the signal RS1. Thus, the characteristics of the signal RS2 may be related to the characteristics of the echo signal 12 and the transmission signal 13.

The sampler 131 may receive a reception clock RCLK from the clock generation unit 110. The sampler 131 may sample the signal RS2 received from the amplifier 132 based on the reception clock RCLK. For example, the sampler 131 may sample the signal RS2 in response to a pulse of the reception clock RCLK. The sampler 131 may generate the sampled signal S1 based on the signal RS2 and the reception clock RCLK.

For example, the sampler 131 may sample the signal RS2 in response to the rising edge of the pulse of the reception clock RCLK. At a particular time, the logical value of the reception clock RCLK at the sampler 131 may change from a logical low value to a logical high value.

Since the signal S1 is generated based on the signal RS1 and the signal RS1 is generated based on the echo signal 12 and the transmission signal 13, the signal S1 may be related to the echo signal 12 and the transmission signal 13. Thus, the signal S1 may represent information related to the target 10 or information related to the transmission signal 13. For example, the signal S1 may represent information related to the range between the radar device 100 and the target 10. Alternatively, the signal S1 may represent information related to a time at which the detection range is zero. The sampler 131 may output the signal S1 to the signal processing unit 140.

Figure 7:
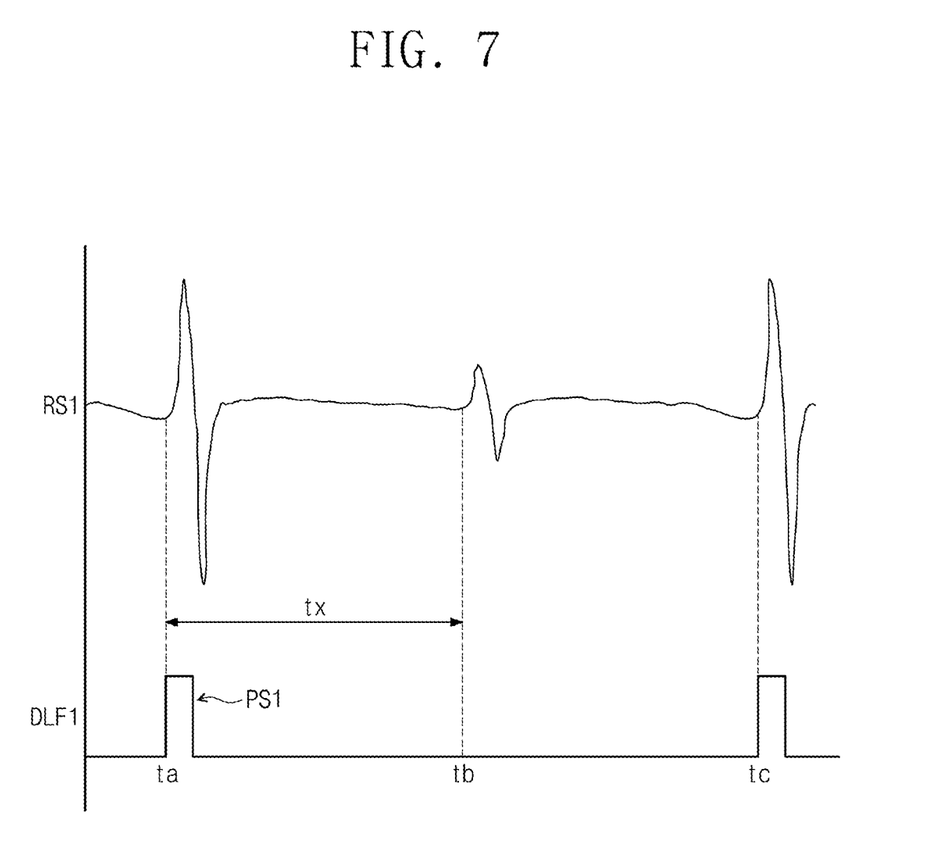
FIG. 7 is an example graph showing a signal of FIG. 1 and a notification signal of FIG. 5.

As described above, the clock generation unit 110 may output a notification signal DLF to the signal processing unit 140 when having the minimum delay. In certain situations, the signal processing unit 140 may output a signal S2 for adjusting the delay in response to the notification signal DLF. For example, the signal processing unit 140 may output the signal S2 to change the detection range. The signal S2 may represent delay information. The clock generation unit 110 may obtain the delay information by the signal S2. The clock generation unit 110 may output a pulse of the transmission clock TCLK and a pulse of the reception clock RCLK based on the delay information. Referring to FIG. 7, the operation of the signal processing unit 140 will be described in more detail.

Figure 8:
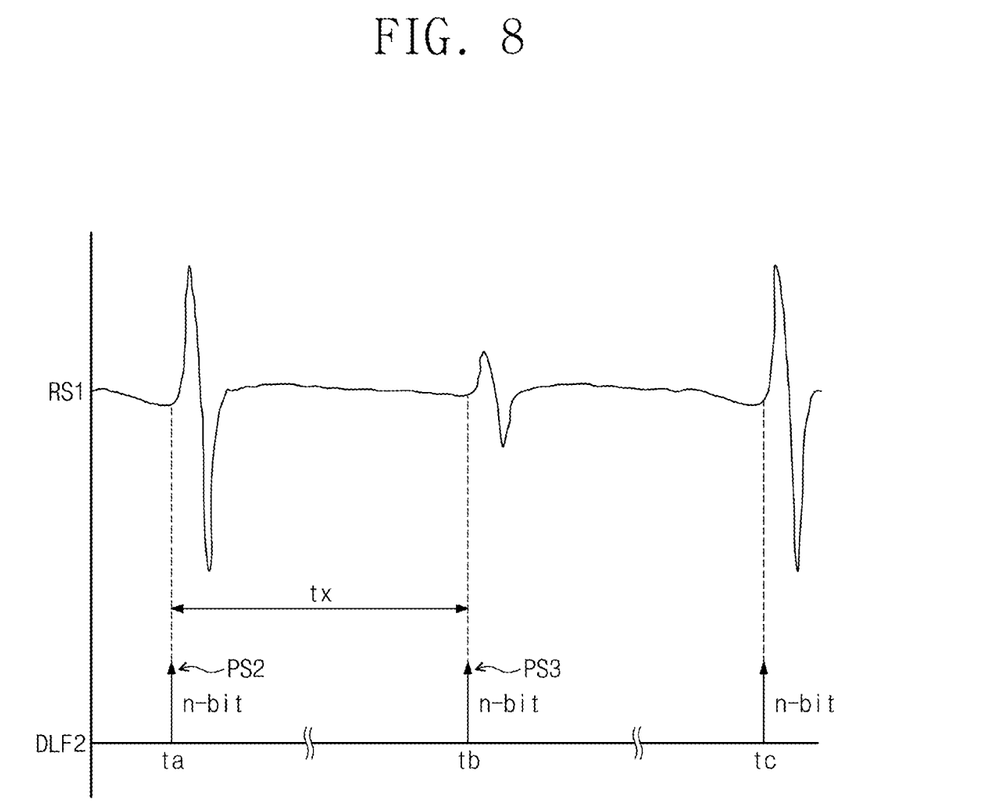
FIG. 8 is an example graph showing a signal of FIG. 1 and a notification signal of FIG. 5.

The clock generation unit 110 may output a notification signal DLF indicating delay information to the signal processing unit 140 when the delay varies. For example, the notification signal DLF may represent n bits of data. The signal processing unit 140 may obtain information associated with the target 10 based on the signal S1 and the notification signal DLF. For example, the information associated with target 10 may be related to detection range. For example, the information associated with the target 10 may be related to the sum of the distance from the transmission antenna 121 to the target 10 and the distance from the target 10 to the reception antenna 133. The signal processing unit 140 may calculate the distance between the radar device 100 and the target 10 based on the information associated with the target 10. Referring to FIG. 8, the operation of the signal processing unit 140 will be described in more detail.

Figure 2:
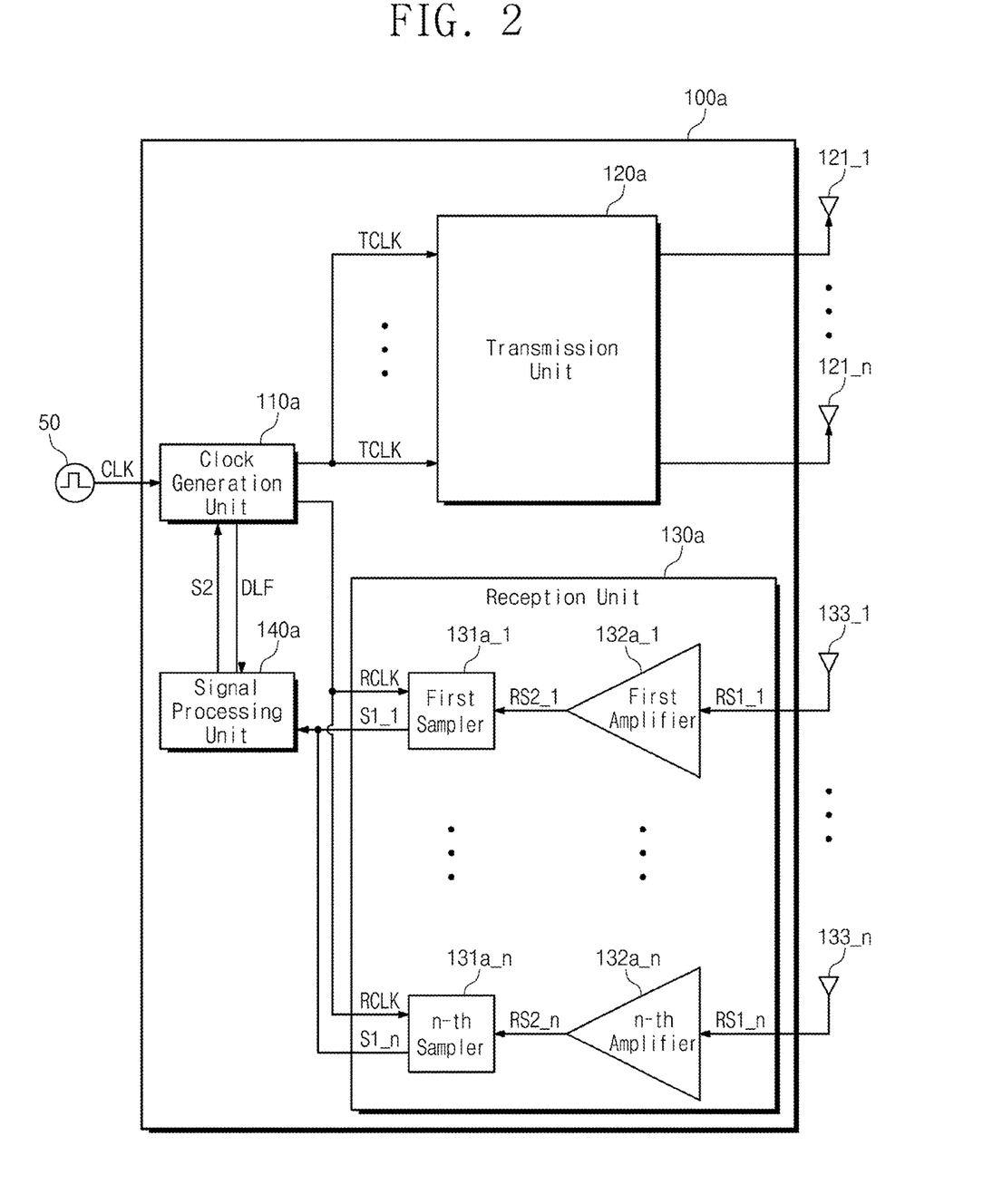
FIG. 2 is a block diagram illustrating a radar device according to an embodiment of the inventive concept.

FIG. 2 is a block diagram illustrating a radar device according to an embodiment of the inventive concept.

Referring to FIG. 2, a radar device 100a may include a clock generation unit 110a, a signal processing unit 140a, a transmission unit 120a, and a reception unit 130a. The radar device 100a may be connected to a first transmission antenna 121_1 to an n-th transmission antenna 121_n and a first reception antenna 133_1 to an n-th reception antenna 133_n. The transmission unit 120a may include n oscillators. The reception unit 120b may include a first sampler 131a_1 to an n-th sampler 131a_n and a first amplifier 132a_1 to an n-th amplifier 132a_n.

The transmission unit 120a may transmit transmission signals through the first transmission antenna 121_1 to the n-th transmission antenna 121_n. For example, a transmission unit may transmit transmission signals generated by n oscillators.

The first reception antenna 133_1 to the n-th reception antenna 133_n may receive echo signals generated by the transmission signals. Alternatively, the first reception antenna 133_1 to the n-th reception antenna 133_n may directly receive transmission signals from the transmission antennas 121_1 to 121_n. The first reception antenna 133_1 to the n-th reception antenna 133_n may receive the echo signals or transmission signals to generate the signals RS1_n to RS1_n, respectively.

The first amplifier 132a_1 to the n-th amplifier 132a_n may receive the signals RS1_1 to RS1_n, respectively. The first sampler 131a_1 to the n-th sampler 131a_n may sample the signals RS2_n to RS2_n, respectively, based on the reception clock RCLK. The first sampler 131a_1 to the n-th sampler 131a_n may output the sampled signals S1_1 to S1_n to the signal processing unit 140a.

FIG. 2 shows an example in which the first sampler 131a_1 to the n-th sampler 131a_n receive the same reception clock (RCLK), but the first sampler 131a_1 to the n-th sampler 131a_n may receive two or more different reception clocks. For example, different reception clocks may be outputted based on different delays. The reception unit 120a may receive different echo signals from targets located at different distances from the radar device 100a, respectively.

The first sampler 131a_1 to the n-th sampler 131a_n may sample the signals RS2_n through RS2_n generated based on different echo signals.

Figure 3:
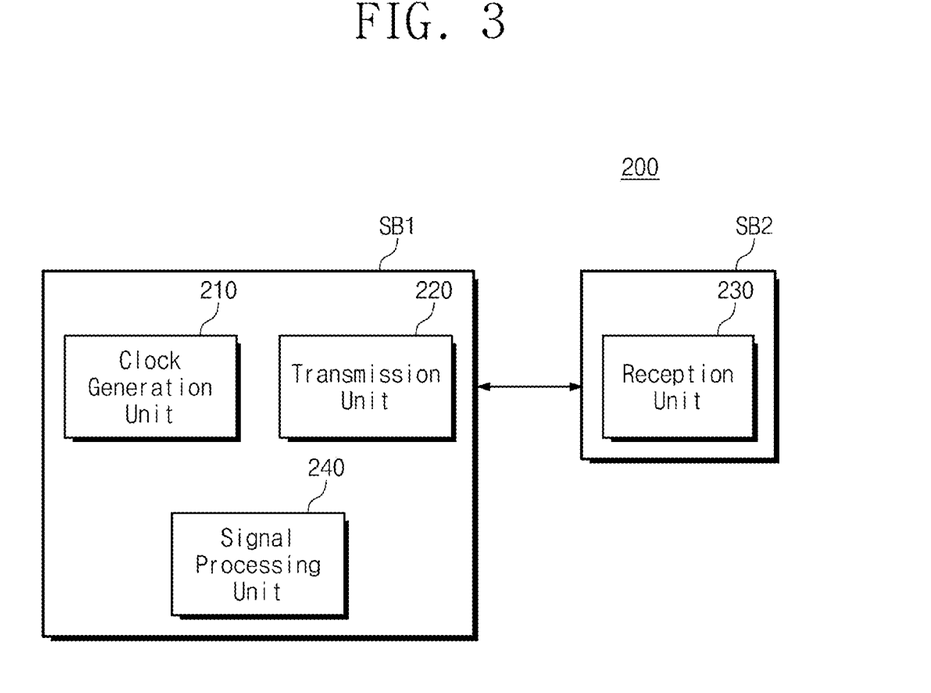
FIG. 3 is a block diagram illustrating a radar device according to an embodiment of the inventive concept.

FIG. 3 is a block diagram illustrating a radar device according to an embodiment of the inventive concept. The radar device 200 of FIG. 3 may include at least one of the radar device 100 of FIG. 1 and the radar device 100a of FIG. 2. The clock generation unit 210 of FIG. 3 may include at least one of the clock generation unit 110 of FIG. 1 and the clock generation unit 110a of FIG. 2. The transmission unit 220 of FIG. 3 may include at least one of the transmission unit 120 of FIG. 1 and the transmission unit 120a of FIG. 2. The reception unit 230 of FIG. 3 may include at least one of the reception unit 130 of FIG. 1 and the reception unit 130a of FIG. 2. The signal processing unit 240 of FIG. 3 may include at least one of the signal processing unit 140 of FIG. 1 and the signal processing unit 140a of FIG. 2.

Referring to FIG. 3, the radar device 200 may include a first substrate SB1 and a second substrate SB2. The clock generation unit 210, the transmission unit 220, and the signal processing unit 240 may be disposed on the first substrate SB1. The reception unit 230 may be disposed on the second substrate SB2. The connection between the clock generation unit 210, the transmission unit 220, the reception unit 230, and the signal processing unit 240 is similar to that described with reference to FIG. 1 and FIG. 2. Therefore, the description thereof will be described. The configurations and operations of the clock generation unit 210, the transmission unit 220, the reception unit 230, and the signal processing unit 240 is similar to those described with reference to FIG. 1 and FIG. 2. Therefore, the description thereof will be described.

When all of the components of the radar device 200 are disposed on one substrate, the transmission unit 220 may be disposed close to the reception unit 230. When the transmission unit 220 and the reception unit 230 are disposed close to each other, signals generated in the transmission unit 220 may cause coupling. The signals generated in the clock generation unit 210, the reception unit 230, and the signal processing unit 240 may include noise due to coupling. The signal processing unit 240 may perform calculations based on signals including noise. Accordingly, the signal processing unit 240 may not accurately calculate the delay, the target position, and the like.

Coupling may be reduced if the substrate on which the reception unit 230 is disposed is different from the substrate on which the clock generation unit 210, the transmission unit 220, and the signal processing unit 240 are disposed. Accordingly, the signal processing unit 240 may accurately calculate the delay, the position of the target, and the like.

FIG. 4 is a block diagram illustrating an example method of adjusting delay by the clock generation unit of FIG. 1.

As described with reference to FIG. 1, the clock generation unit 110 may include a DLL. In the example of FIG. 4, the clock generation unit 110 of FIG. 1 may include a DLL 300. The DLL 300 includes a phase frequency detector (PFD) 310, a charge pump 320, a voltage controlled delay line (VCDL) 330, a multiplexer (MUX) 340, and a capacitor LFC.

The PFD 310 may receive the clock CLKin and the feedback clock FCLK. For example, the clock CLKin may be the reference clock CLK of FIG. 1. The PFD 310 may output the signal PD corresponding to the phase difference between the clock CLKin and the feedback clock FCLK. For example, the PFD 310 may output a signal PD indicating the time difference (i.e., phase difference) between a rising edge of the clock CLKin and a rising edge of the feedback clock FCLK.

The charge pump 320 may receive the signal PD from the PFD 310. The charge pump 320 may output the voltage Vc based on the signal PD. The magnitude of the voltage Vc may correspond to the phase difference between the clock CLKin and the feedback clock FCLK. The VCDL 330 may receive the voltage Vc.

The capacitor LFC may be connected to a backend of the charge pump 320 to control the VCDL 330. The magnitude of the voltage Vc may correspond to the phase difference between the clock CLKin and the feedback clock FCLK.

The VCDL 330 may output the clock delayed by a certain time based on the voltage Vc. For example, the VCDL 330 may include one or more buffers to output a delayed clock.

According to the method described above, the VCDL 330 may output clocks delayed by various times. The VCDL 330 may output the clocks delayed by various times to the MUX 340. The MUX 340 may selectively output one of the clocks delayed by various times. For example, the MUX 340 may output the clock CLKout.

For example, the clock CLKout may be the transmission clock TCLK or the reception clock RCLK of FIGS. 1 and 2. The DLL 300 may generate a pulse of the transmission clock TCLK and after a specific delay the DLL 300 generate a pulse of the reception clock RCLK. The clock generation unit 110 of FIG. 1 and the clock generation unit 110a of FIG. 2 may output the transmission clock TCLK and the reception clock RCLK generated by the DLL 300.

Figure 5:
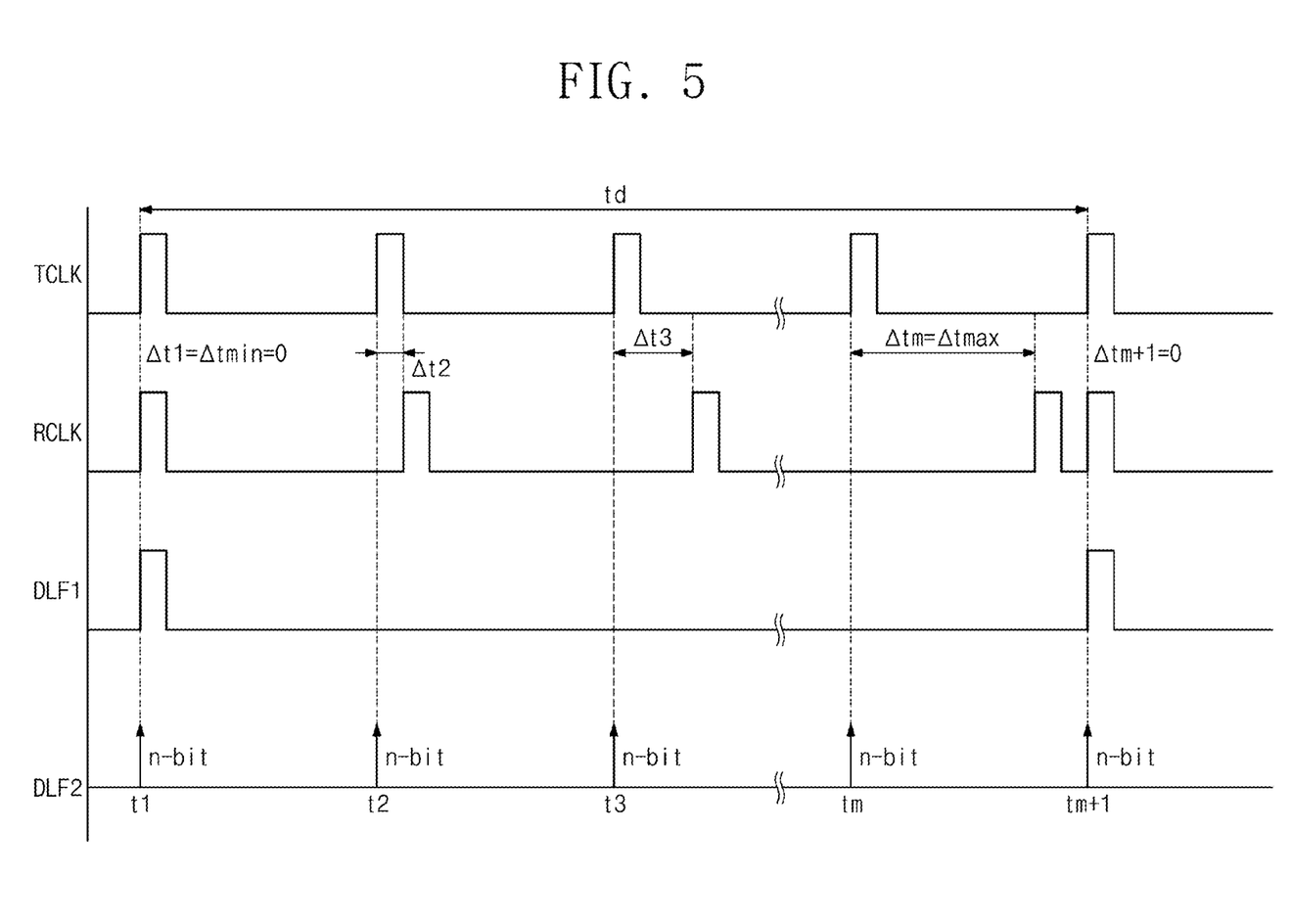
FIG. 5 is a timing diagram showing signals outputted by a clock generation unit of FIG. 1 or FIG. 2.
Figure 6:
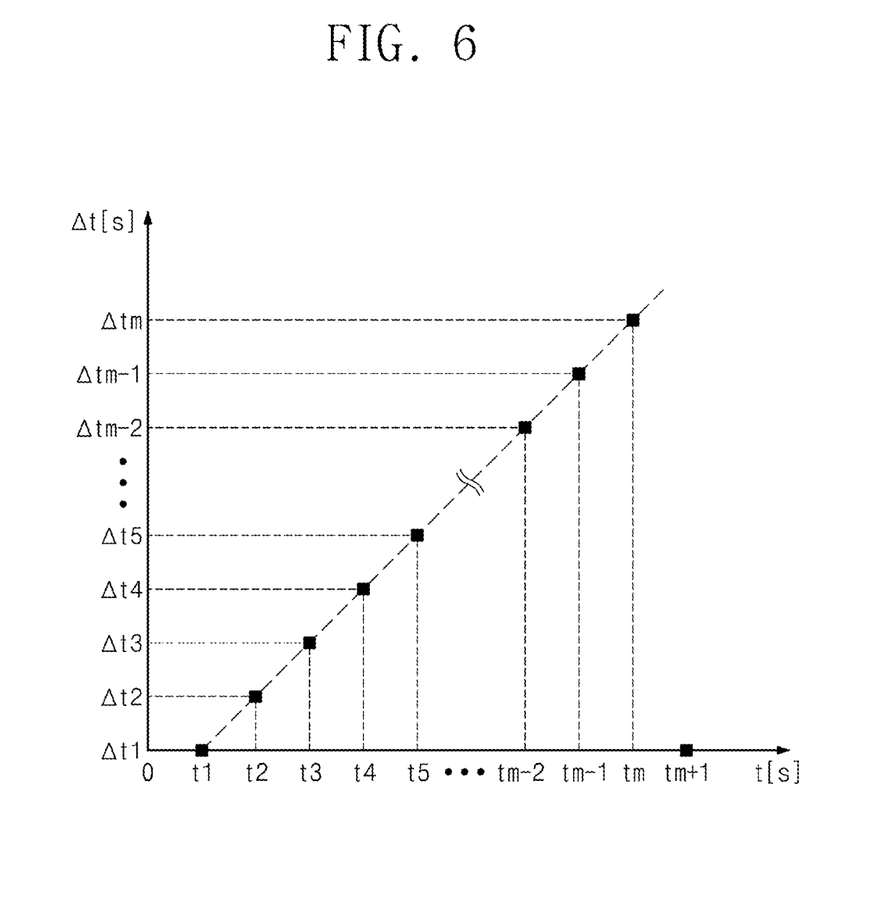
FIG. 6 is a graph illustrating an example delay of FIG. 5.

FIG. 5 is a timing diagram showing signals outputted by the clock generation unit of FIG. 1 or FIG. 2.

The clock generation unit 110 of FIG. 1 or the clock generation unit 110a of FIG. 2 may output the transmission clock TCLK, the reception clock RCLK, and the notification signal DLF of FIG. 5. The notification signal DLF may include at least one of a first notification signal DLF1 and a second notification signal DLF2. Hereinafter, a transmission clock TCLK, a reception clock RCLK, a first notification signal DLF1, and a second notification signal DLF2 outputted by the clock generation unit 110 of FIG. 1 will be described.

As described with reference to FIG. 1, the clock generation unit 110 may start operations upon request of the signal processing unit 140. For example, the clock generation unit 110 may start operations in response to a signal S2 indicating delay information. The clock generation unit 110 may obtain the delay information from the signal S2. The clock generation unit 110 may determine the delays based on the delay information. The clock generation unit 110 may output pulses of the transmission clock TCLK and pulses of the reception clock RCLK based on the determined delays.

For example, the delay information may include information related to a minimum delay $\Delta$tmin. The clock generation unit 110 may obtain information related to the minimum delay $\Delta$tmin from the signal S2. At the time t1, the clock generation unit 110 may output a pulse of the transmission clock TCLK and a pulse of the reception clock RCLK based on the minimum delay $\Delta$tmin. In the example of FIG. 5, the minimum delay $\Delta$tmin may be zero.

For example, the delay information may be related to a difference between the delay corresponding to the time tk and the delay corresponding to the time tk−1 (k is an integer equal to or greater than 1 and equal to or less than m). In the example of FIG. 5, from the time t1 to the time tm, the delay may increase with time. For example, the delay $\Delta$tk corresponding to the time tk may be longer than the delay $\Delta$tk−1 corresponding to the time tk−1.

For example, from the time t1 to the time tm, the difference between the delays may be substantially identical to one another. For example, the difference between the delay Δt2 corresponding to the time t2 and the delay Δt1 corresponding to the time t1 may be substantially equal to the difference between the delay Δt3 corresponding to the time t3 and the delay Δt2 corresponding to the time t2. Referring to FIG. 6, an embodiment of a varying delay is described in more detail.

At the time t1, the clock generation unit 110 may output to the signal processing unit 140 a pulse of the first notification signal DLF1 related to the minimum delay. The signal processing unit 140 may determine a time at which the detection range is minimum in response to a pulse of the first notification signal DLF1.

From the time t1 to the time tm, the clock generation unit 110 may output the pulses of the second notification signal DLF2 to the signal processing unit 140. Each of the pulses of the second notification signal DLF2 may indicate data represented by n bits (n is a natural number). The n-bit data may be related to a delay corresponding to the time at which the pulse of the second notification signal DLF2 is outputted. For example, a pulse of the second notification signal outputted at the time tk may represent a delay Δtk.

A specific delay may correspond to a specific detection range. As described above, the delay from the time t1 to the time tm may be increased. Thus, between the time t1 and the time tm, the detection range of the radar device 100 may increase as the delay increases. At time tm+1, the delay decreases again to the minimum delay, so the detection range of the radar device 100 may decrease to minimum again.

FIG. 6 shows the operation of the radar device 100 for detecting a range from a short detection range to a long detection range at the time between the time t1 and the time tm, but the inventive concept may include all embodiments of the operations of the radar device 100 for detecting variously varying detection ranges.

After the time tm+1, the radar device 100 may detect the same range as the detected range from the time t1 to the time tm. Therefore, after the time tm+1, the radar device 100 may perform operations similar to those performed from the time t1 to the time tm. In other words, the delay may vary with a period of the time td (hereinafter referred to as a delay period). The delay period may be determined by the signal S2.

Alternatively, after the time tm+1, the radar device 100 may detect a range different from the range detected from the time t1 to the time tm. For example, the radar device 100 may detect only a specific range included in the range detected from the time t1 to the time tm. In order to detect different ranges, in response to the pulse of the first notification signal DLF1 and/or the pulse of the second notification signal DLF2, the signal processing unit 140 may output the signal S2 indicating the new delay information to the clock generation unit 110.

In the example of FIG. 5, the delay Δt1 may be the minimum delay Δtmin. That is, the minimum delay Δtmin may be the shortest among other delays in the delay period td. The delay Δtm may be the maximum delay Δtmax within the delay period td. That is, the delay Δtmax may be longest among other delays in the delay period td.

Hereinafter, a transmission clock TCLK, a reception clock RCLK, a first notification signal DLF1, and a second notification signal DLF2 outputted over time are described.

At the time t1, the clock generation unit 110 may start the operation in response to the signal S2 received from the signal processing unit 140. The clock generation unit 110 may output a pulse of the transmission clock TCLK and a pulse of the reception clock RCLK based on the minimum delay Δtmin. For example, the minimum delay Δtmin may be zero. Accordingly, the clock generation unit 110 may substantially simultaneously output the pulse of the transmission clock TCLK and the pulse of the reception clock RCLK.

The time at which the pulse of the transmission clock TCLK is outputted may correspond to the time at which the pulse of the first notification signal DLF1 and/or the pulse of the second notification signal DLF2 are outputted. For example, the clock generation unit 110 may output a pulse of the first notification signal DLF1 at a time t1 when a pulse of the transmission clock TCLK is outputted. Alternatively, the clock generation unit 110 may output a pulse of the second notification signal DLF2 at the time t1. In other words, when the logical value of the transmission clock TCLK changes from a logical low value to a logical high value, the clock generation unit 110 may output a pulse of the first notification signal DLF1 and/or a pulse of the second notification signal DLF2. The pulse of the second notification signal DLF2 outputted at the time t1 may represent the delay Δt1 by the n-bit data.

After the time t1, the clock generation unit 110 may output a pulse of the transmission clock TCLK and a pulse of the reception clock RCLK having the delay Δt2 determined by the delay information obtained from the signal S2. At the time t2, the clock generation unit 110 may output a pulse of the transmission clock TCLK. After a delay Δt2 from the time t2, the clock generation unit 110 may output a pulse of the reception clock RCLK. The clock generation unit 110 may output a pulse of a second notification signal DLF2. The pulse of the second notification signal DLF2 outputted at the time t2 may represent the delay Δt2 using n-bit data. The delay Δt2 may be longer than the delay Δt1.

In a similar manner, the clock generation unit 110 may output pulses of other second notification signals DLF2 after the time t3.

At the time tm, the clock generation unit 110 may output a pulse of the transmission clock TCLK. After the delay Δtm, the clock generation unit 110 may output a pulse of the reception clock RCLK. The delay Δtm may be the maximum delay Δtmax within the delay period td.

Depending on the delay information obtained from the signal S2, the clock generation unit 110 may again reduce the delay at the time tm+1. At the time tm+1, the delay Δtm+1 may be the minimum delay Δtmin. Accordingly, at the time tm+1, the clock generation unit 110 may substantially simultaneously output the pulse of the transmission clock TCLK and the pulse of the reception clock RCLK. At the time tm+1, the clock generation unit 110 may output at least one of a pulse of the first notification signal DLF1 and a pulse of the second notification signal DLF2.

Based on the first notification signal DLF1 and/or the second notification signal DLF2, the signal processing unit 140 may calculate the distance between the radar device 100 and the target 10. Referring to FIG. 7, a specific method of calculating the distance between the radar device 100 and the target 10 based on the first notification signal DLF1 will be described. Referring to FIG. 8, a specific method of calculating the distance between the radar device 100 and the target 10 based on the second notification signal DLF2 will be described.

FIG. 6 is a graph illustrating an example delay of FIG. 5. In the example of FIG. 6, the x-axis may represent the time in units of second [s]. The y-axis may represent a delay Δt in units of second [s]. A value on the x-axis corresponding to a specific point on the graph may represent the time at which the transmission clock TCLK pulse is outputted. For example, the value on the x-axis may represent the time at which the logical value of the transmission clock TCLK changes from a logical low value to a logical high value.

Referring to FIG. 5 together with FIG. 6, the time at which the pulse of the transmission clock TCLK is outputted may correspond to the time at which the pulse of the second notification signal DLF2 is outputted. In addition, the time at which the pulse of the transmission clock TCLK is outputted may be related to the time at which the transmission signal 11 is radiated. Therefore, the time at which the transmission signal 11 is radiated may correspond to the time at which the pulse of the second notification signal DLF2 is outputted. The value on the x-axis corresponding to a specific point on the graph may be related to the time at which the pulse of the second notification signal DLF2 is outputted and the time at which the transmission signal 11 is emitted.

The delay $\Delta t$ corresponding to the time t1 may be $\Delta t1$. In FIG. 6, $\Delta t1$ may be $\Delta t1$ in FIG. 5, i.e., the minimum delay $\Delta tmin$. Therefore, $\Delta t1$ may be zero. Accordingly, the clock generation unit 110 may substantially simultaneously output the pulse of the transmission clock TCLK and the pulse of the reception clock RCLK. At the time t1, the logical values of the transmission clock TCLK and the reception clock RCLK may change from a logical low value to a logical high value.

The delay $\Delta t$ corresponding to the time t2 may be $\Delta t2$. Accordingly, the clock generation unit 110 outputs a pulse of the transmission clock TCLK and after $\Delta t2$ the unit 110 outputs a pulse of the reception clock RCLK. At the time t2, the logical value of the transmission clock TCLK may change from a logical low value to a logical high value. After $\Delta t2$ from the time t2, the logical value of the reception clock RCLK may change from a logical low value to a logical high value.

According to a similar method, the delay $\Delta t$ indicated in the graph may be increased at regular intervals. Thus, within the delay period td, the delay may have a larger value at the end of the period td. When the intervals between neighboring times are identical to one another, the difference between delays corresponding to the respective neighboring times, may be substantially identical to one another. For example, the time between the time tk and the time tk+1 may be substantially equal to the time between the time tk+1 and the time tk+2. The value obtained by subtracting $\Delta tk$ from $\Delta tk+1$ may be substantially equal to the value obtained by subtracting $\Delta tk+1$ from $\Delta tk+2$. (In the example of FIG. 6, k is an integer of 1 or more, and m−2 or less)

As described with reference to FIG. 5, the delay $\Delta t$ may similarly vary at each one delay period td. At time tm+1, the delay $\Delta t$ may again be reduced to a minimum value, i.e., zero. After the time tm+1, the delay $\Delta t$ may vary in a manner similar to that described with reference to the graph between the time t1 and the time tm at each delay period td.

FIG. 6 shows an embodiment in which the difference between the delay $\Delta tk$ at the time tk and the delay $\Delta tk+1$ at the time tk+1 is constant according to k. However, the inventive concept may include all embodiments in which the difference between the delay $\Delta tk$ and the delay $\Delta tk+1$ is not constant according to k. For example, the difference between the delay $\Delta tk$ and the delay $\Delta tk+1$ may be constant according to $k^1$. For example, the difference between the delay $\Delta tk$ and the delay $\Delta tk+1$ may be constant according to $i^k$ (i is a natural number). For example, the delay may change after having a uniform value during a specific time section (i.e., an increase or a decrease of the stairway form).

Although FIG. 6 shows a delay increasing at regular intervals over time, the inventive concept may include all embodiments of decreasing delay over time.

FIG. 7 is an example graph showing the signal of FIG. 1 and the notification signal of FIG. 5. As described with reference to FIG. 1, the signal processing unit 140 may calculate the distance between the radar device 100 and the target 10 based on the signal S1 and the notification signal DLF. A method for the signal processing unit 140 to calculate the distance between the radar device 100 and the target 10 based on the signal S1 and the first notification signal DLF1 will be described.

Since the signal S1 is generated based on the signal RS1, a method for the signal processing unit 140 to calculate the distance between the radar device 100 and the target 10 will be described with reference to FIG. 1 and FIG. 7.

At the time ta, the reception unit 130 may receive the transmission signal 13 through the reception antenna 133. The reception antenna 133 may output the signal RS1 based on the transmission signal 13. The reception unit 130 may output the signal S1 based on the signal RS1.

At the time ta and the time tc, the clock generation unit 110 may output the transmission clock TCLK and the reception clock RCLK with the minimum delay. That is, the time ta and the time tc may correspond to the minimum delay. For example, the delay corresponding to the time ta may be the delay t1 of FIG. 5. As described with reference to FIG. 5, when the delay is at a minimum, the clock generation unit 110 may output a pulse of the first notification signal DLF1. For example, at the time ta, the clock generation unit 110 may output the pulse PS1. The pulse PS1 may be a square wave.

At the time tb, the reception unit 130 may receive the echo signal 12 through the reception antenna 133. The reception antenna 133 may generate the signal RS1 based on the echo signal 12. The signal processing unit 140 may receive the signal S1 corresponding to the signal RS1.

As described with reference to FIG. 1, the echo signal 12 may be received by the transmission signal 11 reflected by the target 10. The magnitude of the transmission signal 11 and the magnitude of the echo signal 12 may decrease when signal travels through; when the transmission signal 11 is transmitted to the target 10 and reflected by the target 10, and when the echo signal 12 is received from the target 10).

The transmission signal 13 may be radiated from the transmission unit 120 through the transmission antenna 121. The transmission signal 13 may be received directly from the transmission antenna 121 through the reception antenna 133. The transmission distance of the transmission signal 13 (the distance from the transmission antenna 121 to the reception antenna 133) may be shorter than the transmission distance of the echo signal 12 (the sum of the distance from the transmission antenna 121 to the target 10 and the distance from the reception antenna 133 to the target 10). As the transmission distance of the signal is shorter, the magnitude of the signal may be less decreased in the transmission process. Thus, the magnitude of the transmission signal 13 may be greater than the magnitude of the echo signal 12.

Since the signal RS1 is generated based on the echo signal 12, the magnitude of the signal RS1 may be related to the magnitude of the echo signal 12. The magnitude of the signal RS1 outputted after the time tb is related to the magnitude of the transmission signal 13 and the magnitude of the signal RS1 outputted after the time ta may be related to the magnitude of the echo signal 12. Therefore, the magnitude of the signal RS1 outputted after the time tb may be smaller than the magnitude of the signal RS1 outputted after the time ta.

Hereinafter, an example method of obtaining the distance between the radar device 100 and the target 10 based on the first notification signal DLF1 and the echo signal 12 will be described. However, the inventive concept is not limited thereto, and may include all embodiments for obtaining the distance between the radar device 100 and the target 10 based on the first notification signal DLF1 and the echo signal 12.

At the time ta, the signal processing unit 140 may receive a pulse PS1 of the first notification signal DLF1 from the clock generation unit 110. The signal processing unit 140 may obtain data on the time ta from the pulse PS1.

As described above, the reception unit 130 may receive the echo signal 12 through the reception antenna 133 after the time tb. The reception antenna 133 may generate a signal RS1 generated from the echo signal 12. The signal processing unit 140 may receive the signal S1 corresponding to the signal RS1. The signal processing unit 140 may obtain information on the time tb from the signal S1 received after the time tb.

For example, the magnitude of the signal RS1 before the time tb may be uniform. After the time tb, the magnitude of the signal RS1 may increase. As the magnitude of the signal RS1 increases, the magnitude of the signal S1 may also increase. The signal processing unit 140 may determine the time at which the magnitude of the signal S1 starts to increase as the time tb. Since the time tb is related to the time at which the echo signal 12 is received, the signal processing unit 140 may obtain information on the time at which the echo signal 12 is received based on the signal S1.

The signal processing unit 140 may obtain the time tx between the time ta and the time tb based on the data associated with the time ta and the data associated with the time tb. The signal processing unit 140 may obtain the delay corresponding to the time tb from the time tx.

The clock generation unit 110 may obtain the delay information based on the signal S2. Referring to FIG. 6 again, the delay information may be related to the difference value between the delay Δtk and the delay Δtk+1. In addition, the difference value between the delay Δtk and the delay Δtk+1 may be constant according to k. Thus, the clock generation unit 110 may calculate the difference value between the values of the delay corresponding to each of the two times, from the time interval between the two times. In the example of FIG. 7, the clock generation unit 110 may calculate the delay corresponding to the time tb based on the delay information, the time ta, and the time tb.

In the specification below, the target delay may refer to a delay corresponding to a time at which the signal S1 generated based on the echo signal 12 is received by the signal processing unit 140. In the example of FIG. 7, the target delay may be a delay corresponding to the time tb.

As described with reference to FIG. 1, the transmission unit 120 may emit a transmission signal 11 based on a pulse of a transmission clock TCLK. Accordingly, the pulse of the transmission clock TCLK may be related to the time at which the transmission signal 11 is radiated. If the target 10 is located at a specific distance, the reception unit 130 may generate the signal S1 based on the pulse of the reception clock RCLK and the echo signal 12. Thus, the pulse of the reception clock RCLK may be related to the time at which the echo signal 12 is received.

The clock generation unit 110 may output a pulse of the transmission clock TCLK at the time tb and output a pulse of the reception clock RCLK after the target delay from the time tb. Thus, the time between the time at which the transmission signal 11 is emitted and the time at which the echo signal 12 is received may correspond to a target delay.

The time between the time at which the transmission signal 11 is emitted and the time at which the echo signal 12 is received may correspond to the detection range. The detection range may be related to the sum of the distance from the transmission antenna 121 to the target 10 and the distance from the target 10 to the reception antenna 133. Thus, the detection range may correspond to the distance between the radar device 100 and the target 10.

The signal processing unit 140 may obtain the distance between the radar device 100 and the target 10 in a manner different from the method described above. As described above, the magnitude of the signal RS1 generated from the transmission signal 13 may be greater than the magnitude of the signal RS1 generated from the echo signal 12. Thus, when the magnitude of the signal RS1 increases by more than the reference magnitude, the signal processing unit 140 may obtain data on the time at which the transmission signal 13 is received, that is, data on the time ta, from the magnitude of the signal S1 corresponding to the signal RS1.

The signal processing unit 140 may obtain data on the time ta from the signal S1 generated based on the signal RS1 which changes after the time ta. Then, the signal processing unit 140 may calculate the distance between the radar device 100 and the target 10 in a similar manner to using the data associated with the time ta obtained from the first notification signal DLF1.

In the process of generating the signal S1 based on the signal RS1, the signal S1 may include noise components due to various causes. For example, coupling may occur during the generation of the signal S1, as described with reference to FIG. 3. The signal S1 may include noise due to coupling. Due to the noise components, the signal S1 may include inaccuracy in it. Therefore, the data associated with the time ta obtained from the signal S1 corresponding to the signal RS1 may not be accurate. For example, the data associated with the time ta obtained from the signal S1 may represent a time different from the actual time ta.

The first notification signal DLF1 may be received directly from the clock generation unit 110 to the signal processing unit 140. The signal transmission path between the clock generation unit 110 and the signal processing unit 140 may be shorter than the signal transmission path between the reception antenna 133 and the signal processing unit 140. Therefore, the first notification signal DLF1 may include less noise components than the signal S1. The data associated with the time ta represented by the first notification signal DLF1 may more accurately represent the time ta than the data associated with the time ta represented by the signal S1. The signal processing unit 140 may obtain an accurate time (the time ta) corresponding to the minimum delay by the first notification signal DLF1. The signal processing unit 140 may obtain an accurate delay corresponding to the time tb based on the obtained time ta.

FIG. 8 is an example graph showing the signal of FIG. 1 and the notification signal of FIG. 5.

As described with FIG. 1, the signal processing unit 140 may calculate the distance between the radar device 100 and the target 10 based on the signal S1 and the notification signal DLF. Based on the signal S1 and the second notification signal DLF2, a method for the signal processing unit 140 to calculate the distance between the radar device 100 and the target 10 is described. The description related to the signal RS1 of FIG. 8 is similar to that described with reference to FIG. 7.

Since the signal S1 is generated based on the signal RS1, referring to FIG. 1 and the graphs of FIG. 8 showing the signal RS1 and the second notification signal DLF2, a method for the signal processing unit 140 to calculate the distance between the radar device 100 and the target 10 will be described.

As described with reference to FIG. 5, the clock generation unit 110 may output the second notification signal DLF2 each time the delay is changed. The second notification signal DLF2 may include pulses representing n bit data. The n-bit data represented by the pulse may be related to a delay corresponding to a specific time. For example, the pulse PS2 may be related to a delay corresponding to the time ta.

The signal processing unit 140 may obtain a delay corresponding to the time ta from the pulse PS2. The delay corresponding to the time ta may be the minimum delay. For example, the delay corresponding to the time ta may be the delay $\Delta t1$ of FIG. 5.

The signal processing unit 140 may obtain the target delay corresponding to the time tb from the pulse PS3. As described with reference to FIG. 7, the time tb may be related to the time at which the echo signal 12 is received. Thus, the signal processing unit 140 may obtain a target delay corresponding to the time at which the echo signal 12 is received from the pulse PS3.

The signal processing unit 140 may calculate the distance between the radar device 100 and the target based on the target delay. The specific calculation method is similar to that described with reference to FIG. 7, and the description thereof will be omitted.

Figure 9:
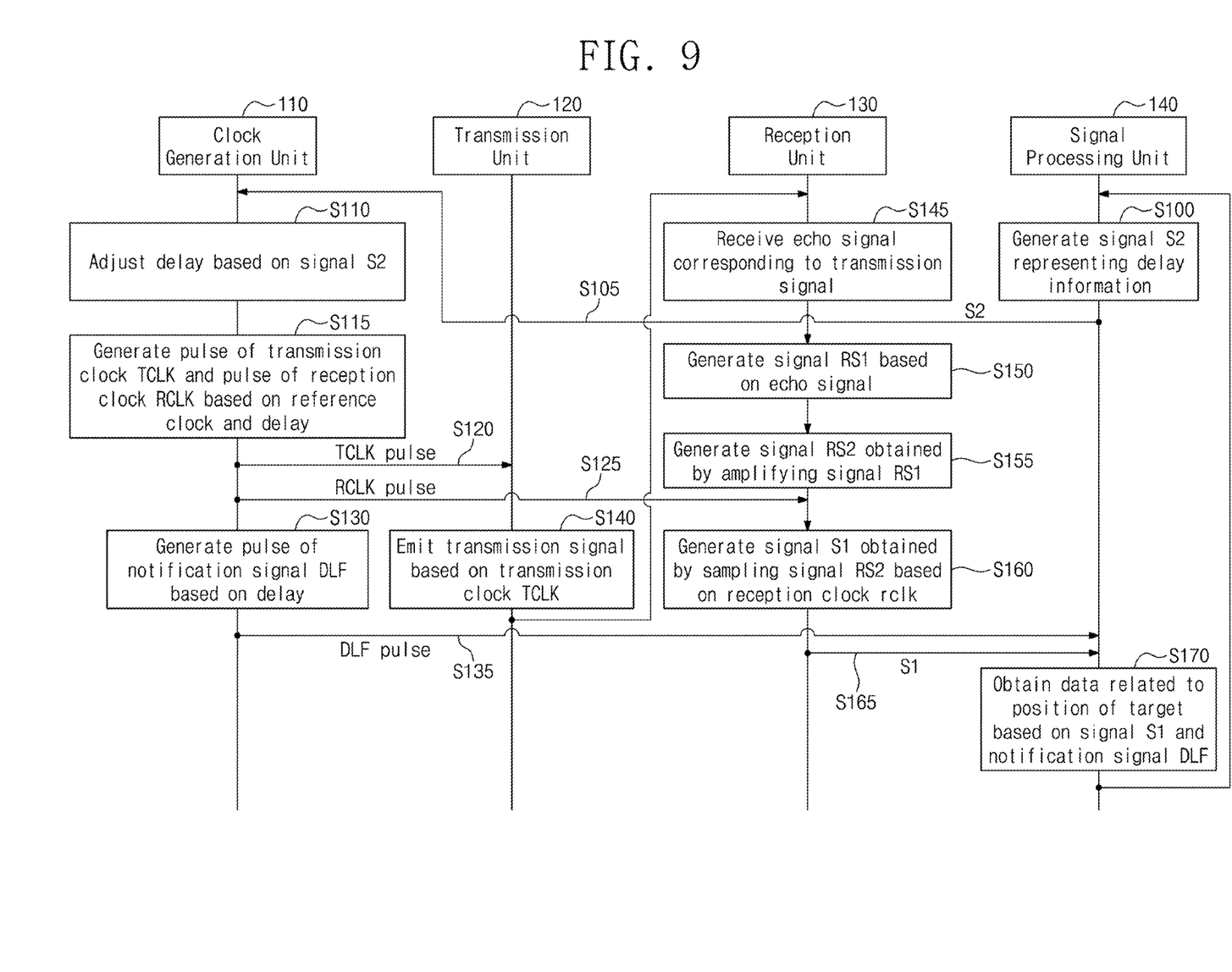
FIG. 9 is a flowchart showing an example method of calculating the distance between a radar device and a target by a radar device of FIG. 1.

FIG. 9 is a flowchart illustrating an example method of calculating the distance between a radar device and a target by the radar device of FIG. 1.

In operation S100, the signal processing unit 140 may generate a signal S2 indicating delay information to start an operation. For example, the delay information may include information such as a minimum delay, difference values between delays, and so on. FIG. 9 illustrates an embodiment of the clock generation unit 110 that starts an operation in response to the signal S2 received from the signal processing unit 140. However, the inventive concept may include an embodiment of the clock generation unit 110 that is configured to start an operation according to delay information stored in the clock generation unit 110 when power is applied.

In operation S105, the signal processing unit 140 may output the signal S2 generated in operation S100 to the clock generation unit 110.

In operation S110, the clock generation unit 110 may determine the delay based on the signal S2 outputted in operation S105. For example, the clock generation unit 110 may obtain delay information from the signal S2. The clock generation unit 110 may determine the delay based on the delay information. For example, the clock generation unit 110 may increase the delay based on the delay information.

In operation S115, the clock generation unit 110 may generate a pulse of the transmission clock TCLK and a pulse of the reception clock RCLK based on the delay determined in operation S110. As described with reference to FIGS. 1 and 4, the clock generation unit 110 may include a DLL 300. The clock generation unit 110 may generate pulses of the transmission clock TCLK and pulses of the reception clock RCLK based on various delays by the DLL 300.

In operation S120, the clock generation unit 110 may output a pulse of the transmission clock TCLK generated in operation S115 to the transmission unit 120.

In operation S125, the clock generation unit 110 may output a pulse of the reception clock RCLK generated in operation S115 to the reception unit 130. The clock generation unit 110 may output the reception clock RCLK based on the delay determined in operation S110. For example, the clock generation unit 110 may output the transmission clock TCLK in operation S110 and then output the reception clock RCLK to the reception unit 130 after a delay.

In operation S130, the clock generation unit 110 may generate a notification signal DLF based on the delay determined in operation S110. For example, the clock generation unit 110 may generate a notification signal DLF each time the delay changes. For example, the notification signal DLF outputted in operation S130 may be the second notification signal DLF2 of FIGS. 5 and 8.

In operation S135, the clock generation unit 110 may output the notification signal DLF generated in operation S130 to the signal processing unit 140.

It is described that operations from S115 to S135 are performed sequentially. However, operations S115 to S135 may be performed substantially simultaneously. For example, referring to FIG. 5, at the time t1, one of the pulse of the transmission clock TCLK, the pulse of the reception clock RCLK, and the pulses of the first notification signal DLF1 and the second notification signal DLF2 may be outputted substantially simultaneously.

In operation S140, the transmission unit 120 may emit the transmission signal 11 based on the transmission clock TCLK outputted by the clock generation unit 110 in operation S120. As described in FIG. 1, the transmission unit 120 may include an oscillator for emitting transmission signals.

In operation S145, the reception unit 130 may receive an echo signal 12 corresponding to the transmission signal 11 emitted in operation S140 through the reception antenna. The transmission signal 11 may be reflected by the target 10. The echo signal 12 may be generated as the transmission signal 11 is reflected by the target 10. Thus, the echo signal 12 may represent information related to the target 10. For example, the echo signal 12 may represent information related to the location and speed of the target 10.

In operation S150, the reception unit 130 may generate the signal RS1 based on the echo signal 12 received in operation S135. Since the signal RS1 is generated based on the echo signal 12, the signal RS1 may represent information related to the target 10.

In operation S155, the reception unit 130 may amplify the signal RS1 by the amplifier 132. The reception unit 130 may amplify the signal RS1 to generate the signal RS2. Since the signal RS2 is generated based on the signal RS1, the signal RS2 may represent information related to the target 10.

In operation S160, the reception unit 130 may sample the signal RS2 by the sampler 131. The sampler 131 may sample the signal RS2 based on the reception clock RCLK outputted in operation S115. The sampler 131 may generate the signal S1 obtained by sampling the signal RS2.

In operation S165, the reception unit 130 may output the signal S1 generated in operation S160 to the signal processing unit 140.

In operation S170, the signal processing unit 140 may calculate the distance between the radar device 100 and the target 10 based on the notification signal DLF outputted in operation S135 and the signal S1 outputted in operation S165. For example, the signal processing unit 140 may calculate the distance between the radar device 100 and the target 10 based on the notification signal DLF received prior to S100 operation, i.e., the notification signal DLF corresponding to the minimum delay. Alternatively, the signal processing unit 140 may calculate the distance between the radar device 100 and the target 10 based on the notification signal received in operation S135.

After operation S170, the radar device 100 may again perform operation S100.

According to an embodiment of the inventive concept, a radar device may obtain accurate information related to the location of objects.

Although the example embodiments of the inventive concept have been described, it is understood that the inventive concept should not be limited to these example embodiments but various changes and modifications can be made by one ordinary skilled in the art within the spirit and scope of the inventive concept as hereinafter claimed.

What is claimed is:

1. A radar device comprising:
a clock generator configured to:
output a transmission clock,
output a reception clock at a second time point after a delay from a first time point at which the transmission clock is outputted, and
generate a notification signal when the delay has a minimum value;
a transmitter configured to emit a transmission signal based on the transmission clock;
a receiver configured to:
receive an echo signal corresponding to the transmission signal and
generate a first signal corresponding to the echo signal based on the reception clock; and
a signal processor configured to:
obtain a third time point at which the delay has the minimum value based on the notification signal,
obtain a fourth time point at which the echo signal is received by the receiver based on the first signal,
obtain the delay based on the third time point and the fourth time point, and
obtain data associated with a location of a target based on the delay,
wherein within a period in which the delay between the first time point and the second time point changes, the delay has one of different values, and the minimum value is a smallest value among the different values, and
wherein a first path of the notification signal transmitted from the clock generator to the signal processor is shorter than a second path of the first signal transmitted from the receiver to the signal processor.

2. The radar device of claim 1, wherein the transmitter comprises an oscillator configured to generate an oscillated signal based on the transmission clock.

3. The radar device of claim 1, wherein the signal processor generates a second signal for adjusting the delay,
wherein the delay and the period are configured to be determined based on the second signal.

4. The radar device of claim 1, wherein the receiver comprises a sampler configured to sample a third signal generated from the echo signal,
wherein the first signal is obtained by sampling the third signal.

5. The radar device of claim 1, wherein the clock generator comprises a delay locked loop configured to generate the transmission clock at the first time point and to generate the reception clock at the second time point.

6. The radar device of claim 5, wherein the clock generator adjusts the delay by utilizing the delay locked loop and the delay has one of the different values.

7. The radar device of claim 1, wherein the fourth time point arrives after the third time point,
wherein a delay value corresponding to the fourth time point among the different delay values is larger than a delay value corresponding to the third time point among the different delay values.

8. The radar device of claim 1, wherein the signal processor is configured to obtain a delay corresponding to the fourth time point based on the third time point and the fourth time point and obtain the data associated with the location of the target based on the delay corresponding to the fourth time point.

9. The radar device of claim 1, wherein the transmitter is connected to a transmission antenna for emitting the transmission signal, and the receiver is connected to a reception antenna for receiving the echo signal, and
wherein the second path is a signal transmission path from the reception antenna to the signal processing unit.

10. The radar device of claim 1, wherein the clock generator is configured to start an operation in response to a second signal received from the signal processor.

11. A radar device comprising:
a transmitter configured to emit a transmission signal based on a transmission clock outputted at a first time point;
a receiver configured to generate a first signal, both based on a reception clock outputted at a second time point and on an echo signal, after a delay from the first time point;
a clock generator configured to output the transmission clock and the reception clock and to generate a notification signal when the delay has a minimum value; and
a signal processor configured to obtain the delay based on both the notification signal and the first signal, and to obtain data associated with a location of a target based on the delay,
a first path of the notification signal transmitted from the clock generator to the signal processor is shorter than a second path of the first signal transmitted from the receiver to the signal processor.

12. The radar device of claim 11, wherein the delay changes over time, and has one of different values during a period in which the delay changes.

13. The radar device of claim 12, wherein as a time point corresponding to the delay is later in the period, the delay has a larger value.

14. The radar device of claim 11, wherein the notification signal is expressed with one or more bits associated with the delay.

15. The radar device of claim 1, wherein the clock generator outputs a pulse of the transmission clock, a pulse of the reception clock, and a pulse of the notification signal simultaneously when the delay has the minimum value.

* * * * *